United States Patent [19]
Kuwabara et al.

[11] Patent Number: 5,875,014
[45] Date of Patent: Feb. 23, 1999

[54] OPTICALLY ANISOTROPIC FILM AND LIQUID CRYSTAL DISPLAY APPARATUS

[75] Inventors: Masato Kuwabara; Toshihiro Ohnishi, both of Ibaraki, Japan

[73] Assignee: Sumitomo Chemical Company, Limited, Osaka, Japan

[21] Appl. No.: 853,921

[22] Filed: May 9, 1997

[30] Foreign Application Priority Data

May 9, 1996 [JP] Japan ................................. 8-114817

[51] Int. Cl.$^6$ ................................................ G02F 1/1335
[52] U.S. Cl. ............................................. 349/117; 349/165
[58] Field of Search ..................... 349/117, 163, 349/165; 359/494, 500; 428/1

[56] References Cited

U.S. PATENT DOCUMENTS

| | | | |
|---|---|---|---|
| 4,387,133 | 6/1983 | Ichikawa et al. | 349/122 |
| 4,830,469 | 5/1989 | Breddels et al. | 349/165 |
| 5,499,126 | 3/1996 | Abileah et al. | 349/117 |
| 5,699,136 | 12/1997 | Arakawa et al. | 349/118 |

FOREIGN PATENT DOCUMENTS

| | | |
|---|---|---|
| T 4-500284 | 1/1992 | Japan . |
| A 5-27119 | 2/1993 | Japan . |
| A 5-107413 | 4/1993 | Japan . |
| A 5-257013 | 10/1993 | Japan . |
| A 6-130227 | 5/1994 | Japan . |
| A 6-174923 | 6/1994 | Japan . |
| A 7-13023 | 1/1995 | Japan . |
| B 7-13683 | 2/1995 | Japan . |
| A 7-230007 | 8/1995 | Japan . |
| A 8-190094 | 7/1996 | Japan . |

*Primary Examiner*—Hing Dang
*Assistant Examiner*—Tai V. Duong
*Attorney, Agent, or Firm*—Birch, Stewart, Kolasch & Birch, LLP

[57] ABSTRACT

An optically anisotropic film comprising a mixture of a polymer, a dye having an absorption peak not in a visible region but in an ultraviolet region, and occasionally a liquid crystal polymer, wherein the retardation of the optically anisotropic film is between 50 nm and 3000 nm, and the dye has an aspect ratio of 1.5 or more, or the dye shows a dichroism. The optically anisotropic film has a high wavelength dispersion of the retardation, and a liquid crystal display apparatus achieves an excellent black-and-white display by using the optically anisotropic film.

12 Claims, No Drawings

OPTICALLY ANISOTROPIC FILM AND LIQUID CRYSTAL DISPLAY APPARATUS

BACKGROUND OF THE INVENTION

1. Field of the Invention

The present invention relates to an optically anisotropic film used for liquid crystal display apparatuses, nonlinear optical devices and the like, and a liquid crystal display apparatus using said film.

2. Description of the Related Art

A retarder obtained by uniaxially stretching a transparent thermoplastic polymer film, is used as an optical compensation film (hereinafter, sometimes referred to as color compensation film) for compensating coloration of liquid crystal display devices, particularly, super twisted nematic (hereinafter, sometimes referred to as STN) liquid crystal display devices and electrically controlled birefringence (hereinafter, sometimes referred to as ECB) liquid crystal display devices (hereinafter, sometimes referred to as LCDs) to improve their display qualities. Liquid crystal display devices using the retarder have the advantages of being light in weight, thin and inexpensive.

However, the STN LCD has the disadvantage of slow response time. To make the response time faster, it is effective to decrease the cell gap by using liquid crystals having a large birefringence Δ n. Liquid crystals having a large Δ n show, generally, a high wavelength dispersion of the birefringence, and it is known that the retardation of the retarder used with the liquid crystal cell also should have a high wavelength dispersion in order to compensate the high wavelength dispersion of Δ n of the liquid crystals. Use of a retarder having a high wavelength dispersion of retardation is effective.

A liquid crystal display apparatus having high contrast is not obtained when a fast-response liquid crystal cell, i.e. a liquid crystal cell comprising a liquid crystal having a large Δ n is used in combination with a retarder having a conventional wavelength dispersion of retardation. Hence, a retarder having a high wavelength dispersion characteristic corresponding to the wavelength dispersion characteristic of birefringence of the liquid crystal material used for fast response STN liquid crystal cells has been desired.

As a means for improving the wavelength dispersion of a retarder, JP-A-5-107413 discloses a retarder using polysulfone (hereinafter, sometimes referred to as PSf) having a high wavelength dispersion. Likewise, JP-A-6-174923 discloses the use of polyarylate having a high wavelength dispersion. However, polysulfone and polyarylate are difficult to process since their glass-transition temperatures are high, and this causes manufacturing problems.

Moreover, since the wavelength dispersion characteristic of retardation differs depending on the liquid crystal material used for the liquid crystal cell, it is sometimes necessary to control the wavelength dispersion characteristic of the retarder. JP-A-5-27119 and JP-A-6-130227 show that the wavelength dispersion can be controlled by a combination of optically anisotropic substances having different wavelength dispersion values.

JP-T-4-500284 shows a retarder using a side-chain liquid crystal polymer having a linear or cyclic main chain and having a temperature dependence and a wavelength dispersion the same as those of the liquid crystal molecules used for the liquid crystal cell. This prior art discloses that a liquid crystal polymer film is formed on the orientation film and that an oriented liquid crystal polymer film is obtained by applying a field such as an electric field or a magnetic field to the liquid crystal polymer film. However, since the liquid crystal polymer has a large refractive index anisotropy regardless of whether it is of main-chain type or of side-chain type, it is difficult to manufacture a large-area film of required thickness accuracy by using such a liquid crystal polymer.

JP-A-5-257013 describes a retarder having a wavelength dispersion of refractive index anisotropy the same as that of the liquid crystal molecules used for the liquid crystal cell by dispersing liquid crystal molecules into a polymer film and stretching them together with the polymer film. However, this prior art does not specifically describe a preferred wavelength dispersion characteristic, the physical properties and the structure of the liquid crystal and to what extent the liquid crystal should be dispersed.

JP-A-7-13683 shows in its 6 th embodiment an example where the wavelength dispersion is improved by blending polyvinyl chloride with a liquid crystal compound. However, a substance such as polyvinyl chloride having a low softening point can not be used in a high-temperature environment since deformation and deterioration in optical characteristics occur.

JP-A-7-13023 discloses a method for adjusting the wavelength dispersion by adding a plasticizer to polycarbonate or polyarylate. However, this prior art does not describe the addition of a dye which absorbs ultraviolet light.

SUMMARY OF THE INVENTION

An object of the present invention is to provide an optically anisotropic film whose retardation has a high wavelength dispersion, a method for producing the optically anisotropic film without any complicated process, and a liquid crystal display apparatus which achieves an excellent black-and-white display by using the optically anisotropic film.

As a result of extensive studies to solve the above-mentioned problems, the inventors found that by mixing a polymer (hereinafter, referred to as matrix polymer or matrix) with a specific dye or by mixing a polymer with a liquid crystal polymer and a dye, an optically anisotropic film whose retardation has a high wavelength dispersion is easily obtained without the use of a polymer whose retardation has a high wavelength dispersion.

The present invention is described in the following disclosure.

[1] An optically anisotropic film comprising a mixture of a polymer and a dye, wherein the dye has an absorption peak not in a visible region but in an ultraviolet region, an aspect ratio defined as a ratio of a major axis length to a minor axis length of the dye molecule is at least 1.5, and a retardation (measurement wavelength 546 nm) of the optically anisotropic film is between 50 nm and 3000 nm. (Hereinafter, sometimes referred to as first invention.)

[2] An optically anisotropic film comprising a mixture of a polymer and a dye, wherein the dye has an absorption peak not in a visible region but in an ultraviolet region and shows a dichroism, and a retardation (measurement wavelength 546 nm) of the optically anisotropic film is between 50 nm and 3000 nm. (Hereinafter, sometimes referred to as second invention.)

[3] An optically anisotropic film comprising a mixture of a polymer, a dye and a liquid crystal polymer, wherein the dye has an absorption peak not in a visible region but in an ultraviolet region, an aspect ratio defined as a ratio of a major axis length to a minor axis length of the dye molecule is at least 1.5, and a retardation (measurement wavelength 546 nm) of the optically anisotropic film is between 50 nm and 3000 nm. (Hereinafter, sometimes referred to as third invention.)

[4] An optically anisotropic film comprising a mixture of a polymer, a dye and a liquid crystal polymer, wherein the dye has an absorption peak not in a visible region but in an ultraviolet region, shows a dichroism, and a retardation (measurement wavelength 546 nm) of the optically anisotropic film is between 50 nm and 3000 nm. (Hereinafter, sometimes referred to as fourth invention.)

[5] An optically anisotropic film of [1] or [2], wherein the dye is phase-separated from the polymer and forms a domain, and the value of α of the optically anisotropic film defined by the following formula (1) exceeds 1.06:

$$\alpha = R_F/R_D \qquad (1)$$

where $R_F$ is a retardation value measured with hydrogen F-line (wavelength 486 nm) and $R_D$ is a retardation value measured with sodium D-line (wavelength 589 nm).

[6] An optically anisotropic film of [3] or [4], wherein the dye and the liquid crystal polymer are phase-separated from the polymer to form a domain and forms a domain, and the value of α of the optically anisotropic film defined by the following formula (1) exceeds 1.06:

$$\alpha = R_F/R_D \qquad (1)$$

where $R_F$ is a retardation value measured with hydrogen F-line (wavelength 486 nm) and $R_D$ is a retardation value measured with sodium D-line (wavelength 589 nm).

[7] An optically anisotropic film of [1] or [2], wherein the dye and the polymer are compatible, and the value of α of the optically anisotropic film defined by the following formula (1) exceeds 1.06:

$$\alpha = R_F/R_D \qquad (1)$$

where $R_F$ is a retardation value measured with hydrogen F-line (wavelength 486 nm) and $R_D$ is a retardation value measured with sodium D-line (wavelength 589 nm).

[8] An optically anisotropic film of [3] or [4], wherein the dye, liquid crystal polymer and the polymer are compatible, and wherein the value of α of the optically anisotropic film defined by the following formula (1) exceeds 1.06:

$$\alpha = R_F/R_D \qquad (1)$$

where $R_F$ is a retardation value measured with hydrogen F-line (wavelength 486 nm) and $R_D$ is a retardation value measured with sodium D-line (wavelength 589 nm).

[9] An optically anisotropic film of [1] or [2], wherein the dye is adsorbed and aligned in the polymer, and wherein the value of α of the optically anisotropic film defined by the following formula (1) exceeds 1.06:

$$\alpha = R_F/R_D \qquad (1)$$

where $R_F$ is a retardation value measured with hydrogen F-line (wavelength 486 nm) and $R_D$ is a retardation value measured with sodium D-line (wavelength 589 nm).

[10] An optically anisotropic film of [3] or [4], wherein the dye is adsorbed and aligned in the mixture of the polymer and liquid crystal polymer, and wherein the value of α of the optically anisotropic film exceeds 1.06.

[11] An optically anisotropic film of [1], [2], [3] or [4], wherein a retardation ratio ($R_{40}/R_0$) of the optically anisotropic film satisfies the following expression (2):

$$0.900 < R_{40}/R_0 < 1.100 \qquad (2)$$

where $R_0$ is a retardation viewed parallel to the vertical line of the film, said retardation being measured with a polarizing microscope according to the Sénarmont method (measurement wavelength 546 nm) and $R_{40}$ is a retardation measured when the film is inclined at 40 degrees to horizontal around the slow axis of the film.

[12] A liquid crystal display apparatus using the optically anisotropic film of [1], [2], [3] or [4].

DETAILED DESCRIPTION OF THE INVENTION

The present invention will now be described in detail.

A polymer used for the matrix of the optically anisotropic film of the first and second invention is preferably a polymer whose optical characteristics and configuration do not change at a high temperature or at a laminating temperature of the film on a liquid crystal cell.

A thermoplastic engineering polymer having high glass-transition temperature is preferably used. When using a polymer to which a plasticizer is added, a polymer whose flow temperature or softening temperature is high, is preferably used.

A lower limit of the glass transition temperature or the softening temperature of the matrix polymer is defined by the temperature at which the liquid crystal display apparatus is used so that the changes in optical characteristics and deformation such as the film shrinking do not occur.

An upper limit thereof is also defined by the glass-transition temperature of a polymer. When forming a polymer into an optically anisotropic film, it is necessary to stretch the film with heating, and if the glass-transition temperature of the polymer is too high, it is not industrially preferred.

The glass-transition temperature or the softening temperature of the polymer is preferably between 80° C. and 250° C., more preferably, between 90° C. and 230° C., and particularly preferably, between 100° C. and 200° C.

Examples of the polymers include polycarbonate, polyarylate, diacetyl cellulose, triacetyl cellulose and ethylene vinyl alcohol copolymer. Of these polymers, polycarbonate, polyarylate and triacetyl cellulose are preferable.

As a polymer used for the matrix of the optically anisotropic film of the third or fourth invention, i.e. when a dye and a liquid crystal polymer are mixed with the matrix, a polymer having a small retardation may be used as well as the polymers mentioned above.

In the optically anisotropic film of [3], [4], [6], [8] and [10], which comprises a dye, a liquid crystal polymer and a polymer as the matrix, a polymer having a small retardation is suitably used.

The retardation of the matrix is obtained by measuring the retardation of a polymer film produced under the same conditions as those of the optically anisotropic film except that the dye and the liquid crystal polymer are not contained according to the Sénarmont method.

The retardation Δnd of the matrix is expressed by the product of the birefringence Δn of the matrix polymer and the thickness d of the film. It is not preferable to decrease the retardation by decreasing the thickness of the film because this adversely affects the handling of the film and the uniformity of optical properties of the obtained optically anisotropic film. To decrease the retardation, it is preferable to decrease the birefringence of the matrix.

Generally, the birefringence $\Delta n$ accompanied with the orientation of the polymer is expressed as the following expression (3) using an intrinsic birefringence $\Delta n°$ and an orientation function f of the polymer:

$$\Delta n = \Delta n° \times f \qquad (3)$$

Examples of methods used for decreasing the birefringence of the polymer include a method of using a polymer whose intrinsic birefringence is low, a method of mixing a polymer having positive intrinsic birefringence and a polymer having negative intrinsic birefringence to reduce the apparent intrinsic birefringence, and a method of decreasing the orientation function.

Examples of polymers having a low intrinsic birefringence include: polymethylmethacrylate derivatives such as polymethylmethacrylate, poly-n-butylmethacrylate, poly-t-butylmethacrylate and polyglycolmethacrylate; polyacrylate derivatives such as polymethylacrylate and polyetylacrylate; polyvinyl acetate; polyvinyl butylate; polyoxymethylphenylsilylene; norbornene-ethylene copolymer (e.g. APEL manufactured by Mitsui Petrochemical Industries Ltd.); resins comprising norbornene (e.g. ARTON manufactured by Japan Synthetic Rubber Co. Ltd.); amorphous polyolefins (e.g. ZEONEX manufactured by Nippon Zeon Co., Ltd.) polyester resin for optics (manufactured by Kanebo Ltd.); and acryl-butadiene-styrene copolymer (e.g. TOYOLAC Transparent Grade manufactured by Toray Corp.).

Of these polymers, polymethylmethacrylate, poly-n-butylmethacrylate, poly-t-butylmethacrylate, norbornene-ethylene copolymer, polyester resin for optics, amorphous polyolefin and acryl-butadiene-styrene copolymer are preferable.

A mixture of a polymer having positive intrinsic birefringence and a polymer having negative intrinsic birefringence can be used as the matrix of the optically anisotropic film. Examples of the polymer having positive intrinsic birefringence include polyvinyl chloride, polyvinylidene fluoride, fluorovinylidene/trifluoroethylene copolymer, polyethylene oxide, polyphenylene oxide and polycarbonate, and examples of the polymer having negative intrinsic birefringence include polymethylmethacrylate and polystyrene.

With respect to the mixture of the polymer having positive intrinsic birefringence and the polymer having negative intrinsic birefringence, examples of combinations of polymers which are compatible with each other and their mixing ratios (weight ratios) at which the apparent intrinsic birefringence is reduced are: polyphenylene oxide and polystyrene, 20:80 to 30:70; polyethylene oxide and polymethylmethacrylate, 30:70 to 40:60; fluorovinylidene/trifluoroethylene copolymer and polymethylmethacrylate, 5:95 to 15:85; polyvinylidene fluoride and polymethylmethacrylate, 15:85 to 25:75; and polyvinyl chloride and polymethylmethacrylate, 15:85 to 25:75.

Of these, the combination of polyphenylene oxide and polystyrene and the combination of polyethylene oxide and polymethylmethacrylate are preferable. These combinations are highly soluble in the solvent.

As a method for decreasing the orientation function, it is exemplified to stretch a film comprising the mixture of the polymer and the dye or the mixture of the polymer, the dye and the liquid crystal compound, while heating at a temperature of above the glass-transition temperature or the softening temperature of the polymer and below the melting temperature of the dye or liquid crystal compound.

Examples of polymers suitable for this method include polycarbonate, diacetyl cellulose, triacetyl cellulose, polystyrene, ethylene vinyl alcohol copolymer, polyethylene terephthalate and polyethylene naphthalate. Of these polymers, polycarbonate, triacetyl cellulose, polyethylene terephthalate and polystyrene are preferable.

Additives can be used for the purpose of improving the mechanical strength of the matrix polymers or improving the adhesive property in their lamination on the LCD cell. The kind and amount of the additives are not specifically limited unless the object of the present invention is impaired.

Generally, a substance which selectively absorbs or reflects a visible light strongly and has a peculiar color is called a dye. Whereas in this invention, a compound having an absorption peak in an ultraviolet light region and not having an absorption peak in a visible light region is defined as a dye.

It is essential that the dye used in the present invention have an absorption peak not in the visible region but in the ultraviolet region. The absorption peak wavelength of the dye is preferably between 300 nm and 400 nm, more preferably, between 330 nm and 380 nm.

It is also essential that the aspect ratio of the dye defined in the first and third invention is 1.5 or higher.

The aspect ratio of the dye is obtained by drawing the optimized chemical structure of the dye. The chemical structure is optimized by doing molecular dynamics calculations with a computer. In this invention the major axis length of the dye is defined as the longest inter atom distance of the optimized chemical structure of the dye molecule, and the minor axis length is defined as the longest inter atom distance perpendicular to the major axis of the optimized dye molecule.

In this invention, the chemical structure of a dye is obtained by Chem 3D 3.0 (Cambridge Scientific inc.). The optimization program of the chemical structure is MOPAC93 (Fujitu Co., Ltd.), using AM1 as a parameter of the Hamiltonian and default parameter as a convergence parameter.

The dye used in the second and fourth invention shows dichroism in the ultraviolet region. The dichroic ratio is defined by the ratio of the absorbance at a maximum absorption wavelength in the major axis direction of the dye molecules to the absorbance in the direction perpendicular to the major axis direction. The dichroic ratio can be obtained by measuring the absorbance in the major axis direction and the perpendicular direction when aligning the dye when the order parameter is over 0.8.

The optically anisotropic film of the first invention and of the second invention are essentially identical. In the same manner the optically anisotropic film of the third invention and of the fourth invention are essentially identical.

When it is difficult to observe the dichroic ratio of a dye due to its poor orientation, a dye usable in this invention is prescribed by the aspect ratio defined above.

The aspect ratio of the dye in this invention is preferably between 1.5 to 20, more preferably between 1.8 to 15. The dichroic ratio of the dye is preferably between 2 and 50, more preferably between 3 and 30.

Examples of dyes satisfying these conditions include benzotriazol series, benzophenon series, pyrazoline series, diphenyl polyene series, binaphthyl polyene series, biphenanthrenyl polyene series, styrylbenzoxazol series, stilbene series, benziden series, benzothiazole series, benzoxazol series, benzimidazole series, hydroxyazobenzene series, aminoazobenzene series, coumarin series, nitrodiphenylamine series, and derivatives of dyes of these series. Dyes used as fluorescent brightening agents and ultraviolet absorbers or UV light stabilizers are also suitably used.

Any dyes that satisfy the above-mentioned conditions can be used in the present invention. Examples of dyes which can be used in the present invention are shown in Table 1 with their dye number as listed in Dye Handbook (published by Koudansya Scientific, 1986).

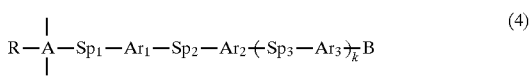

In the formula, A is a group expressed by formula (5) or (6) shown below.

In formula (5), —Si—O— is the main chain of the formula (4). This chain may be cyclic or linear.

In formula (6), —C—CH$_2$— is the main chain of the formula (4), and COO group bonds to Sp1.

TABLE 1

| 2005 | 10112 | 14722 | 15066 | 27503 | 73004 | 73105 | 73302 |
|---|---|---|---|---|---|---|---|
| 5701 | 10113 | 14731 | 15067 | 32002 | 73005 | 73107 | 73311 |
| 5702 | 10114 | 14901 | 17011 | 32207 | 73006 | 73108 | 73401 |
| 5703 | 10311 | 14913 | 21006 | 34005 | 73007 | 73111 | 73403 |
| 5704 | 10312 | 15001 | 21007 | 51113 | 73008 | 73112 | 75002 |
| 5705 | 10313 | 15006 | 21231 | 61032 | 73009 | 73115 | 75003 |
| 10001 | 10314 | 15007 | 21232 | 61051 | 73010 | 73123 | 75015 |
| 10002 | 10323 | 15008 | 21237 | 61081 | 73011 | 73201 | 75020 |
| 10003 | 14502 | 15009 | 21247 | 70008 | 73012 | 73203 | 76101 |
| 10004 | 14511 | 15061 | 21332 | 70107 | 73013 | 73205 | 76102 |
| 10101 | 14512 | 15062 | 21414 | 70110 | 73101 | 73206 | |
| 10102 | 14711 | 15063 | 21424 | 73001 | 73102 | 73211 | |
| 10103 | 14712 | 15064 | 22204 | 73002 | 73103 | 73212 | |
| 10111 | 14721 | 15065 | 24113 | 73003 | 73104 | 73301 | |

The liquid crystal polymer used for an optically anisotropic film according to the third and fourth invention, i.e. an optically anisotropic film comprising a mixture of a dye, a liquid crystal polymer and a polymer will now be described.

The liquid crystal polymer preferably shows nematic or smectic phase. The temperature at which the liquid crystal shows nematic or smectic phase is preferably between −30° C. and 200° C., more preferably, between −30° C. and 150° C., and particularly preferably, −30° C. and 120° C. Liquid crystal polymers having the above-described temperature range can be used singly, or in mixture.

The liquid crystal polymer used in the present invention has a high molecular weight as a liquid crystal and includes also the one called liquid crystal oligomer. A preferable lower limit of the molecular weight or the degree of polymerization of the liquid crystal polymer is defined in view of the phase separation from the matrix polymer and a preferable upper limit of the molecular weight or the degree of polymerization is defined in view of light scattering. That is, when the molecular weight is too high, the particle diameter of the mixture of the phase-separated dye and liquid crystal polymer exceeds the wavelength of light in the matrix and light scattering occurs, which is not preferable. When the molecular weight is too low, the phase separation does not readily occur and the liquid crystal does not orient, and that is not preferable.

The number-average molecular weight of the liquid crystal polymer used in the present invention is preferably between 1200 and 10000, and more preferably, between 1500 and 6000.

Examples of liquid crystal oligomers used in the present invention include a side-chain liquid crystal oligomer and a main-chain liquid crystal oligomer. A side-chain liquid crystal oligomer is preferable because its molecular weight is easily controlled.

An example of the side-chain liquid crystal oligomer is expressed by the following formula (4):

In formula (4), when A is expressed by formula (5), R is an alkyl or phenylene group having one to six carbon atoms. In formula (4), when A is expressed by formula (6), R is alkyl or alkoxy group having one to six carbon atoms.

In formula (4), Ar1, Ar2 and Ar3 are each independently 1,4-phenylene group, 1,4-cyclohexylene group, pyridine-2, 5-diyl group, pyrimidine-2,5-diyl group, or derivatives of these groups.

Sp1 is an alkyl or alkoxy group having two to eight carbon atoms. Sp2 and Sp3 are each independently —COO—, —OCO—, —NCH—, —CHN—, —CH$_2$—CH$_2$—, —CH$_2$—O—, —O—CH$_2$—, —N=N—, a single bond (corresponding to the direct bond of Ar1 and Ar2 or Ar2 and Ar3), or a group expressed by the following formula (7). k is an integer 0 or 1 (k=0 corresponds to the direct bond of Ar2 and B).

B is a cyano group, halogen, alkyl or alkoxy group having one to six carbon atoms, acrylate group, or methacrylate group.

These side-chain liquid crystal oligomers may be used singly or mixed. The side-chain liquid crystal oligomer is not necessarily an oligomer having single kind of side-chain but may be a copolymer or co-oligomer having different kinds of side chains.

There is an upper limit to the mixing ratio of the dye and/or liquid crystal polymer to the polymer matrix. This is because if the mixing ratio is too high, the mechanical strength of the optically anisotropic film decreases which makes its handling difficult. Moreover, if the mixing ratio is too low, the optical properties of the optically anisotropic film are not satisfied, which is not preferable.

When the dye is mixed with the matrix polymer, the concentration of the dye [dye/(sum of the dye and the matrix polymer)] is preferably between 0.01% and 20% by weight, more preferably, between 0.1% and 15% by weight, and particularly preferably, between 0.5% and 12% by weight.

When the dye and the liquid crystal polymer are mixed with the polymer matrix, the concentration of the dye [dye/(sum of the dye, the liquid crystal polymer and the matrix polymer)] is preferably between 0.01% and 20% by weight, more preferably, between 0.1% and 15% by weight, and particularly preferably, between 0.5% and 12% by weight. The concentration of the liquid crystal polymer [liquid crystal polymer/(sum of the dye, the liquid crystal polymer and the matrix polymer)] is preferably between 0.01% and 20% by weight, more preferably, between 0.1% and 15% by weight, and particularly preferably, between 0.5% and 12% by weight.

The configuration of the dye or the dye and liquid crystal polymer in the optically anisotropic film according to the present invention will now be described.

In the optically anisotropic film of the present invention, the dye or the dye and liquid-crystal polymer may be separated from the polymer matrix and form a domain. They may be also compatibilized with the polymer matrix.

The dye may be adsorbed to the polymer or the polymer and liquid crystal polymer. Whether the phase separation, the compatibilization or the adsorption occurs depends on the combination of the dye, the polymer and the liquid crystal polymer.

In the optically anisotropic film of the present invention, when the dye or the dye and liquid crystal polymer is phase-separated in the matrix to form a domain, scattering of visible light may occur at the interface of the domain and the matrix.

It is preferable that internal scattering due to scattering at the interface is small. This is because the polarization state of the scattered light changes, and if the internal scattering is high, the characteristics of the film may be worsened and the transmittance of the visible light may be decreased.

In the optically anisotropic film of the present invention, when the dye or the dye and liquid crystal polymer are compatibilized, or when the dye is adsorbed to the polymer or the polymer and liquid crystal polymer, conventional compatibilizers can be used.

In the optically anisotropic film of the present invention, when the domain of the dye or the dye and liquid crystal polymer is formed, the major axis length of the domain is preferably between 20 nm and 500 nm, and more preferably, between 30 nm and 400 nm.

The retardation (measurement wavelength 546 nm) of the optically anisotropic film of the present invention viewed parallel to the vertical line of the film is between 50 nm and 3000 nm and preferably, between 100 nm and 2500 nm.

As an index which shows the wavelength dispersion of retardation of the optically anisotropic film of this invention, the value of α given in the following equation is used:

$$\alpha = R_F / R_D$$

wherein $R_F$ is the value of retardation determined with F line (wavelength: 486 nm) of hydrogen, and $R_D$ is the value of retardation determined with D line (wavelength: 589 nm) of sodium, viewed parallel to the vertical line of the film according to the Sénarmont method.

The value of α of the optically anisotropic film of the present invention is preferably between 1.061 and 1.300 and more preferably, between 1.065 and 1.250.

The ratio $R_{40}/R_0$ is used as an index of the optically anisotropic film having an excellent viewing angle, wherein $R_0$ is the retardation value of the film measured parallel to the vertical line of the film and $R_{40}$ is a retardation value of the film measured when the film is inclined at 40 degrees to the horizontal about the slow axis of the film. In the optically anisotropic film of the present invention, the ratio is preferably higher than 0.900 but lower than 1.100. The ratio may be determined according to the viewing angle dependent on the liquid crystal cell used in combination with the film.

A method for producing the optically anisotropic film of the present invention will now be described.

The optically anisotropic film of the present invention can be obtained by mixing a polymer with a dye or with a dye and liquid crystal polymer, forming them into a film, and then stretching the film (hereinafter, sometimes referred to as first production method).

The optically anisotropic film can also be obtained by forming a film, stretching the film, and then adsorbing a dye on the film (hereinafter, sometimes referred to as second production method).

In the first production method of the present invention, when mixing the dye or the dye and the liquid crystal polymer with the matrix polymer, it is preferable to mix them in a solution state so that they are uniformly mixed. A specific method is that the polymer is suspended or dissolved in a solvent and the dye or the dye and the liquid crystal polymer are suspended or dissolved in the solvent to mix them with the polymer. The solvents used in the present invention preferably have high solubility to the polymer.

Examples of production methods of the film comprising the dye and the matrix or the film comprising the dye, the liquid crystal and the matrix include: a solvent casting method where the dye, the liquid crystal and the matrix polymer are dissolved in a solvent and cast; an extrusion method where the materials being solid are kneaded and formed into a film by extruding from a die; a calendaring method where the materials being solid are kneaded and formed into a film by calendaring rolls; and a pressing method where the materials are formed into a film by pressing. Of these methods, and the solvent casting method which gives an excellent film in thickness precision is preferable.

If the film is too thin, the mechanical strength is badly affected, and if the film is too thick, the evaporation speed of the solvent when the film is produced by solvent casting decreases and reduces the productivity. The thickness of the produced film is preferably between 20 $\mu$m and 500 $\mu$m, and more preferably, between 50 $\mu$m and 300 $\mu$m.

As to the second production method of the optically anisotropic film of the present invention, a dye may be adsorbed on the film obtained in the same manner of the first production method except without mixing a dye.

Examples of adsorption methods for the dye include a method of dissolving the dye in a solvent which is a poor solvent for a stretched film but is a good solvent for the dye, and impregnating the dye into the stretched film in the dye solution, a method of melting the dye at a temperature below the softening temperature of the film and above the melting temperature of the dye, and impregnating the dye into the stretched film in the molten dye, and a method of impregnating the dye powder into the stretched film.

In the method for stretching the produced film while heating, the same methods may be used for the optically anisotropic films of the present invention except for the optically anisotropic film as described in [11], and examples of the methods include tenter stretching, roll stretching and roll compression stretching. In view of the uniformity of the film surface, tenter stretching and roll stretching are preferable.

There is no specific limitation to the film heating method.

As a stretching method for the optically anisotropic film as described in [11], known methods may be used. For example, the following methods may be used: (A) a method where the film produced by the above-described film production process is uniaxially stretched and as shown in JP-A-6-300916, at the time of the heat relaxation at the glass-transition temperature or the softening temperature, the uniaxially stretched film is shrunk in the direction of the stretching while suppressing the stretch in a direction parallel with the film surface and vertical to the stretched axis; (B) a method where the film produced by the above-described film production process is uniaxially stretched, a heat-shrinkable film is laminated on at least one of the surfaces of the uniaxially stretched film so that the axis of the heat shrinkage of the heat-shrinkable film is perpendicular to the stretching axis of the uniaxially stretched polymer film and the obtained lamination is heated to be heat-shrunken; and (C) a method where, as shown in JP-A-5-157911, a heat-shrinkable film is laminated on at least one of the surfaces of the film produced by the above-described film production process so that the heat shrinkage axis of the heat-shrinkable film is perpendicular to the stretching axis of the uniaxially stretched polymer film and the obtained lamination is stretched.

Of these methods, the methods (A) and (B) are preferable due to their mass production capability and cost.

While any of the above-described methods may be used to uniaxially stretch the film, in view of the controllability of the refractive index in the direction of the thickness and the uniformity of the retardation within the film stretching between rolls and tenter stretching are preferable.

The heating temperature in stretching the film by these stretching methods is determined according to the softening temperature of the matrix polymer used and the transition temperature of the dye and the liquid crystal used.

If the stretching ratio is too low, the dye and the liquid crystal are not sufficiently oriented and if the magnification is too high, the film is so thin that it is difficult to handle. Specifically, the stretching ratio is preferably between 1.1 to 20 times and more preferably, between 1.2 to 15 times.

There are no specific limitations to the stretching speed and to the cooling temperature after the stretching.

PREFERRED EMBODIMENT OF THE INVENTION

While embodiments of the present invention will hereinafter be described, the present invention is not limited thereto.

The structure of the liquid crystal polymer was confirmed based on an elemental analysis, an infrared absorption spectrum and a $^1$H-NMR spectrum, and the molecular weight thereof was confirmed based on gel permeation chromatography (GPC).

The retardation of the optically anisotropic film of the present invention was measured according to the Sénarmont method with a polarized microscope having a monochromater (TFM120-AFT manufactured by Oak Seisakusho) by use of a λ/4 plates of 400 nm, 420 nm, 440 nm, 460 nm, 480 nm, 500 nm, 525 nm, 550 nm, 575 rim, 600 nm, 650 nm, 700 nm and 800 nm.

The value of α defined by formula (1) expressing the wavelength dispersion of the optically anisotropic film was calculated by formula (1). Specifically, curve fitting of the retardation measured according to the Sénarmont method was performed by use of the Lorentz' formula (expression (8) shown below), the retardation values at 486 nm and 589 nm were calculated by expression (8) using the fitting coefficients obtained as a result of the fitting, and α was calculated by the expression (1).

[Expression 8]

$$R(\lambda) = A \sqrt{1 + \frac{B}{\lambda^2 - \lambda_0^2}} \tag{8}$$

In formula (8), λ is a measured wavelength, R(λ) is a retardation at the measured wavelength, A, B and $\lambda_0$ are the fitting coefficients.

The viewing angle dependence of the optically anisotropic film was evaluated by measuring according to the Sénarmont method the retardation viewed in the direction of the normal of the film and the retardation obtained when the film is inclined around the slow axis of the film with 546 nm light by use of a polarizing microscope having an inclination jig.

EXAMPLE 1

Cyclic siloxane oligomer (nematic phase; nematic/isotropic phase transition temperature 121° C.; polystyrene reduced value average molecular weight 2030)as a liquid crystal oligomer, a fluorescent brighter (Whitefluor PHR manufactured by Sumitomo Chemical Co., Ltd.; absorption peak at 375 nm, and aspect ratio 4.6) as a dye and polymethylmethacrylate (Sumipex MHF manufactured by Sumitomo Chemical Co., Ltd., glass-transition temperature 122° C.) were mixed in a ratio of liquid crystal oligomer:dye:polymethylmethacrylate=0.9:10:90 (weight ratio). The mixture was dissolved in methylene chloride so as to be 20% by weight. By casting the obtained solution on a glass plate, a film with a thickness of 100 μm was obtained. The film stretched 2.0-fold at 100° C., thereby obtaining an optically anisotropic film where α defined by the formula 1 is 1.103.

By using the obtained optically anisotropic film in combination with a fast response STN cell, an excellent black-and-white display is achieved.

Comparative Example 1

An optically anisotropic film is obtained in a similar manner to Example 1 except that no fluorescent brightener is mixed. The value of α of the obtained optically anisotropic film is 1.082 and the wavelength dispersion is low compared with Example 1 where a dye is mixed.

EXAMPLE 2

Ten parts by weight of a fluorescent brighter (Whitefluor B manufactured by Sumitomo Chemical Co., Ltd.; absorption peak at 369 nm, and aspect ratio 1.9) and 90 parts by weight of polycarbonate resin (Panlite C-1400 manufactured by Teijin Ltd.) were dissolved and mixed in methylene chloride so as to be 20% by weight. By casting the obtained solution on a glass plate, a film with a thickness of 100 μm was obtained. The obtained film was stretched 1.5-fold at 130° C., thereby obtaining an optically anisotropic film of α=1.075.

By using the obtained optically anisotropic film in combination with a fast response STN cell, an excellent black-and-white display is achieved.

Comparative Example 2

The wavelength dispersion of the retardation of a polycarbonate retarder (SEF480430 manufactured by Sumitomo Chemical Co., Ltd.) was measured and α was 1.060.

The wavelength dispersion of the retardation of a polysulfone retarder was measured and α was 1.099.

EXAMPLE 3

Ten parts by weight of a UV absorber (Sumisorb 310 manufactured by Sumitomo Chemical Co., Ltd.; absorption peak at 345 nm, and aspect ratio 3.5) as a dye and 90 parts by weight of polycarbonate resin (Panlite C-1400 manufactured by Teijin Ltd.) were dissolved and mixed in methylene chloride so as to be 20% by weight. By casting the obtained solution on a glass plate, a film with a thickness of 100 $\mu$m was obtained. The obtained film was stretched 1.5-fold at 140° C., thereby obtaining an optically anisotropic film of α=1.078.

By using the obtained optically anisotropic film in combination with a fast response STN cell, an excellent black-and-white display is achieved.

EXAMPLE 4

Ten parts by weight of a UV absorber (Sumisorb 310 manufactured by Sumitomo Chemical Co., Ltd.; absorption peak at 345 nm, and aspect ratio 3.5) as a dye and 90 parts by weight of polyarylate resin (U-100 manufactured by Unichika Ltd.) were dissolved and mixed in methylene chloride so as to be 20% by weight. By casting the obtained solution on a glass plate, a film with a thickness of 100 $\mu$m was obtained. The obtained film was stretched 1.9-fold at 195° C., thereby obtaining an optically anisotropic film of α=1.086.

By using the obtained optically anisotropic film in combination with a STN cell, an excellent black-and-white display is achieved.

The optically anisotropic film of the present invention has a retardation with a high wavelength dispersion and by using the optically anisotropic film in combination with a fast response STN liquid crystal cell, a liquid crystal display apparatus achieving an excellent black-and-white display is obtained. In addition, the optically anisotropic film of the present invention is easy to produce compared to conventional retarders made of polysulfone or polyarylate.

What is claimed is:

1. An optically anisotropic film comprising a mixture of a polymer and a dye, wherein the dye has an absorption peak not in a visible region but in an ultraviolet region, an aspect ratio defined as a ratio of a major axis length to a minor axis length of the dye molecule of at least 1.5, and retardation (measurement wavelength 546 nm) of the optically anisotropic film between 50 nm and 3000 nm.

2. An optically anisotropic film comprising a mixture of a polymer and a dye, wherein the dye has an absorption peak not in a visible region but in an ultraviolet region and shows a dichroism, and retardation (measurement wavelength 546 nm) of the optically anisotropic film between 50 nm and 3000 nm.

3. An optically anisotropic film comprising a mixture of a polymer, a dye and a liquid crystal polymer, wherein the dye has an absorption peak not in a visible region but in an ultraviolet region, an aspect ratio defined as a ratio of a major axis length to a minor axis length of the dye molecule of at least 1.5, and a retardation (measurement wavelength 546 nm) of the optically anisotropic film between 50 nm and 3000 nm.

4. An optically anisotropic film comprising a mixture of a polymer, a dye and a liquid crystal polymer, wherein the dye has an absorption peak not in a visible region but in an ultraviolet region, shows a dichroism, and a retardation (measurement wavelength 546 nm) of the optically anisotropic film between 50 nm and 3000 nm.

5. The optically anisotropic film according to claim 1 or 2, wherein the dye is phase-separated from the polymer and forms a domain, and a value of α of the optically anisotropic film defined by the following formula (1) exceeds 1.06:

$$\alpha = R_F/R_D \qquad (1)$$

where $R_F$ is a retardation value measured with hydrogen F-line (wavelength 486 nm) and $R_D$ is a retardation value measured with sodium D-line (wavelength 589 nm).

6. The optically anisotropic film according to claim 3 or 4, wherein the dye and the liquid crystal polymer are phase-separated from the polymer to form a domain and forms a domain, and a value of α of the optically anisotropic film defined by the following formula (1) exceeds 1.06:

$$\alpha = R_F/R_D \qquad (1)$$

where $R_F$ is a retardation value measured with hydrogen F-line (wavelength 486 nm) and $R_D$ is a retardation value measured with sodium D-line (wavelength 589 nm).

7. The optically anisotropic film according to claim 1 or 2, wherein the dye and the polymer are compatible, and a value of α of the optically anisotropic film defined by the following formula (1) exceeds 1.06:

$$\alpha = R_F/R_D \qquad (1)$$

where $R_F$ is a retardation value measured with hydrogen F-line (wavelength 486 nm) and $R_D$ is a retardation value measured with sodium D-line (wavelength 589 nm).

8. The optically anisotropic film according to claim 3 or 4, wherein the dye, liquid crystal polymer and the polymer are compatible, and wherein a value of α of the optically anisotropic film defined by the following formula (1) exceeds 1.06:

$$\alpha = R_F/R_D \qquad (1)$$

where $R_F$ is a retardation value measured with hydrogen F-line (wavelength 486 nm) and $R_D$ is a retardation value measured with sodium D-line (wavelength 589 nm).

9. The optically anisotropic film according to claim 1 or 2, wherein the dye are adsorbed and aligned in the polymer, and wherein a value of α of the optically anisotropic film defined by the following formula (1) exceeds 1.06:

$$\alpha = R_F/R_D \qquad (b\ 1)$$

where $R_F$ is a retardation value measured with hydrogen F-line (wavelength 486 nm) and $R_D$ is a retardation value measured with sodium D-line (wavelength 589 nm).

10. The optically anisotropic film according to claim 3 or 4, wherein the dye is adsorbed and aligned in the mixture of the polymer and liquid crystal polymer, and wherein the value of α of the optically anisotropic film defined in claim 5 exceeds 1.06.

11. The optically anisotropic film according to claim 1, 2, 3 or 4, wherein a retardation ratio ($R_{40}/R_0$) of the optically anisotropic film satisfies the following expression (2):

$$0.900 < R_{40}/R_0 < 1.100 \qquad (2)$$

where $R_0$ is a retardation viewed parallel to the vertical line of the film, said retardation being measured with a polarizing microscope according to a Sénarmont method (measurement wavelength 546 nm) and $R_{40}$ is a retardation measured when the film is inclined at 40 degrees to the horizontal around the slow axis of the film.

12. A liquid crystal display apparatus using the optically anisotropic film according to claim 1, 2, 3 or 4.

* * * * *